United States Patent
Sun et al.

(10) Patent No.: US 9,600,231 B1
(45) Date of Patent: Mar. 21, 2017

(54) MODEL SHRINKING FOR EMBEDDED KEYWORD SPOTTING

(71) Applicant: Amazon Technologies, Inc., Seattle, WA (US)

(72) Inventors: Ming Sun, Boston, MA (US); Björn Hoffmeister, Seattle, WA (US); Shiv Naga Prasad Vitaladevuni, Cambridge, MA (US); Varun Kumar Nagaraja, Hyattsville, MD (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/751,975

(22) Filed: Jun. 26, 2015

Related U.S. Application Data

(60) Provisional application No. 62/132,785, filed on Mar. 13, 2015.

(51) Int. Cl.
| | |
|---|---|
| *G10L 15/18* | (2013.01) |
| *G06F 3/16* | (2006.01) |
| *G10L 15/02* | (2006.01) |
| *G10L 15/06* | (2013.01) |
| *G10L 15/22* | (2006.01) |

(52) U.S. Cl.
CPC .............. *G06F 3/167* (2013.01); *G10L 15/02* (2013.01); *G10L 15/063* (2013.01); *G10L 15/18* (2013.01); *G10L 15/22* (2013.01); *G10L 2015/0638* (2013.01); *G10L 2015/223* (2013.01)

(58) Field of Classification Search
None
See application file for complete search history.

(56) References Cited

U.S. PATENT DOCUMENTS

| | | | | | |
|---|---|---|---|---|---|
| 6,134,344 | A | * | 10/2000 | Burges ................. | G06K 9/6269 382/155 |
| 2006/0112026 | A1 | * | 5/2006 | Graf ..................... | G06K 9/6269 706/14 |
| 2007/0094170 | A1 | * | 4/2007 | Graf ..................... | G06K 9/6269 706/15 |

(Continued)

OTHER PUBLICATIONS

Nanopouos (Nanopoulos, Alexandros, Yannis Theodoridis, and Yannis Manolopoulos. "C2P: clustering based on closest pairs." Proceedings of the international conference on very large data bases. 2001).*

(Continued)

*Primary Examiner* — Pierre-Louis Desir
*Assistant Examiner* — Jonathan Kim
(74) *Attorney, Agent, or Firm* — Seyfarth Shaw LLP; Ilan N. Barzilay; Tyrus S. Cartwright

(57) ABSTRACT

A revised support vector machine (SVM) classifier is offered to distinguish between true keywords and false positives based on output from a keyword spotting component of a speech recognition system. The SVM operates on a reduced set of feature dimensions, where the feature dimensions are selected based on their ability to distinguish between true keywords and false positives. Further, support vectors pairs are merged to create a reduced set of re-weighted support vectors. These techniques result in an SVM that may be operated using reduced computing resources, thus improving system performance.

20 Claims, 8 Drawing Sheets

(56) References Cited

U.S. PATENT DOCUMENTS

| | | | | |
|---|---|---|---|---|
| 2007/0203861 A1* | 8/2007 | Gates | ................... | G06K 9/6269 |
| | | | | 706/16 |
| 2010/0191683 A1* | 7/2010 | Nguyen | ............... | G06K 9/6269 |
| | | | | 706/12 |
| 2013/0326625 A1* | 12/2013 | Anderson | ............... | G06F 21/56 |
| | | | | 726/23 |
| 2015/0278849 A1* | 10/2015 | Reichert | ............ | G06Q 30/0276 |
| | | | | 705/14.41 |

OTHER PUBLICATIONS

Xu (Xu, Min, et al. "Audio keywords generation for sports video analysis." ACM Transactions on Multimedia Computing, Communications, and Applications (TOMM) 4.2 (2008): 11.).*

Habib (Habib, Tarek, et al. "Support vector reduction in SVM algorithm for abrupt change detection in remote sensing." Geoscience and Remote Sensing Letters, IEEE 6.3 (2009): 606-610.).*

Nguyen (Nguyen, DucDung, and TuBao Ho. "An efficient method for simplifying support vector machines." Proceedings of the 22nd international conference on Machine learning. ACM, 2005.).*

Nguyen, et al. "An efficient method for simplifying support vector machines." Proceedings of the 22nd international conference on Machine learning. ACM, 2005.

Sun, et al. "Model Shrinking for Embedded Keyword Spotting." 2015 IEEE 14th International Conference on Machine Learning and Applications (ICMLA). IEEE, 2015.

\* cited by examiner

MODEL SHRINKING FOR EMBEDDED KEYWORD SPOTTING

CROSS REFERENCE TO RELATED APPLICATIONS

This application claims priority to U.S. Provisional Patent Application No. 62/132,785, entitled MODEL SHRINKING FOR EMBEDDED KEYWORD SPOTTING, filed on Mar. 13, 2015, in the names of SUN, et al., the disclosure of which is expressly incorporated by reference herein in its entirety.

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
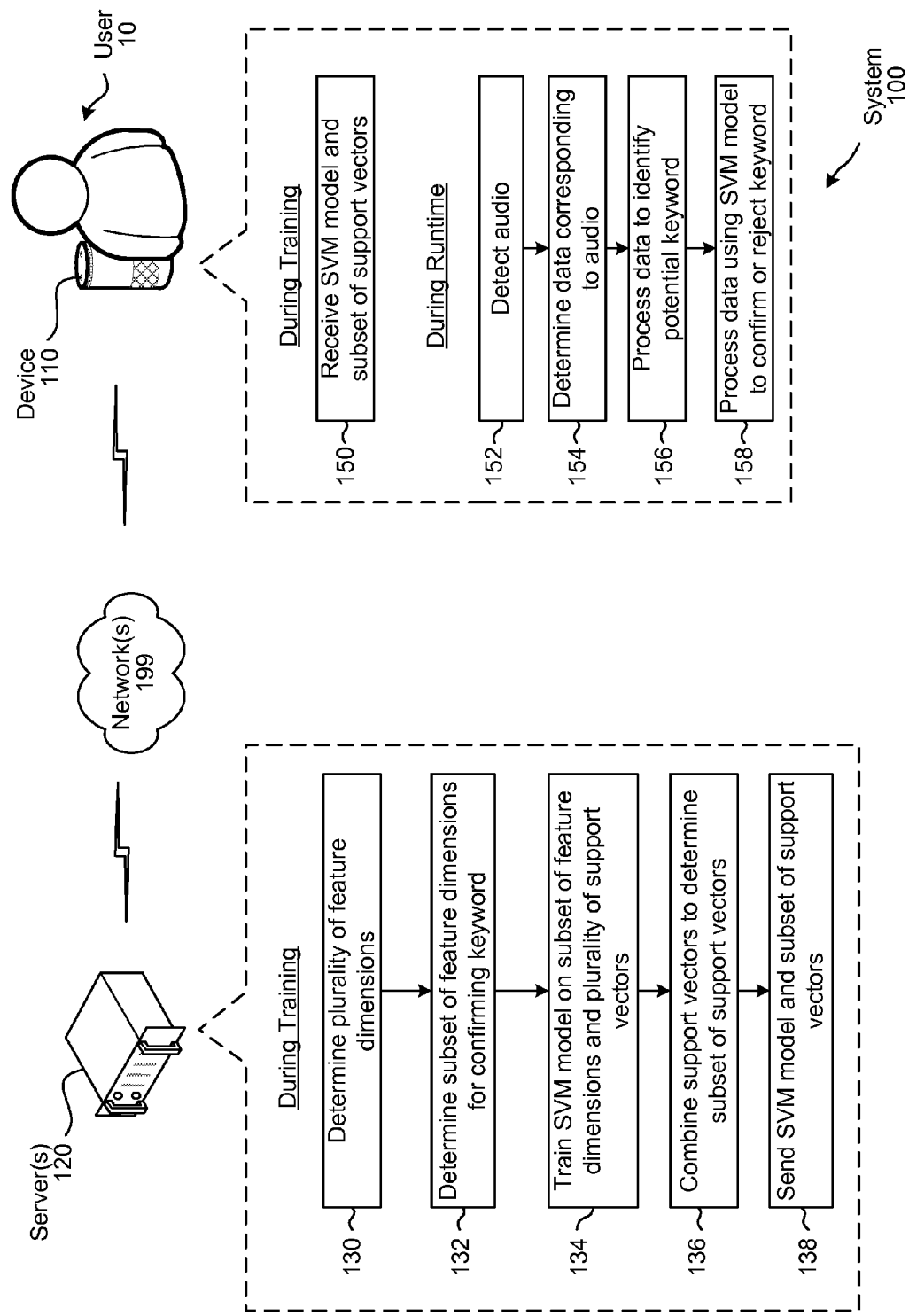
FIG. 1 illustrates a system for keyword recognition according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. A typical such distributed environment may involve a local device having one or more microphones being configured to capture sounds from a user speaking and convert those sounds into an audio signal. The audio signal may then be sent to a downstream remote device for further processing, such as converting the audio signal into an ultimate command. The command may then be executed by a combination of remote and local devices depending on the command itself.

As part of a distributed speech processing system, a local device may be configured to continuously send all detected audio to the remote device. There are several drawbacks to such an approach. One drawback is that such communications would require significant bandwidth and networking resources. Another drawback to such an approach is that privacy concerns may make it undesirable for a local device to send all captured audio to a remote device. A still further drawback is that a remote device may waste significant computing resources processing all incoming audio when no commands are being issued in the majority of the audio.

To account for these problems, a local device may be configured to only activate upon a user speaking a particular waking command to wake the local device so the user may speak a further command. The waking command (which may be referred to as a wakeword), may include an indication for the system to perform further processing. The local device may continually listen for the wakeword and may disregard any audio detected that does not include the wakeword. Typically, systems are configured to detect a wakeword, and then process any subsequent audio following the wakeword (plus perhaps a fixed, but short amount of audio pre-wakeword) to detect any commands in the subsequent audio. As an example, a wakeword may include a name by which a user refers to a device. Thus, if the device was named "Alexa," and the wakeword was "Alexa," a user may command a voice controlled device to play music by saying "Alexa, play some music." The device, recognizing the wakeword "Alexa" would understand the subsequent audio (in this example, "play some music") to include a command of some sort and would perform speech processing on that audio to determine what the command is for execution. Provided services/commands may include performing actions or activities, rendering media, obtaining and/or providing information, providing information via generated or synthesized speech via a local device, initiating Internet-based services on behalf of the user, and so forth.

A wakeword is an example of a keyword, which is a particular word, phrase, expression, or other sound that a system is configured to detect specifically (as contrasted with general speech recognition). To detect a wakeword or other keyword, a two-stage process may be used where the first stage is configured to detect potential keywords in detected audio and a second stage is configured to check the results of the first stage, and filter out false positives so that a system is only likely to recognize true keywords. As keyword detection (also generally known as keyword spotting) typically takes place on a local device that may not have the computing power of a large speech processing server, it is desirable to improve the efficiency of detecting a keyword. To that end, the second stage, which may be implemented as a Support Vector Machine (SVM) classifier, may be configured to reduce a number of features considered by the classifier and may also be configured to merge support vectors. Both these techniques serve to reduce the complexity of the classifier without sufficiently impacting performance quality, thus resulting in more efficient keyword spotting.

As shown in FIG. 1, a system 100 may be configured to perform keyword spotting with a specially configured SVM classifier model. As shown in FIG. 1, a system 100 may include a user device 110 connected to one or more servers 120 across network(s) 199. The server(s) 120 are capable of performing ASR and NLU processing as described herein. A single server may be capable of performing all speech processing or multiple server(s) 120 may combine to perform the speech processing. Further, the server(s) 120 may be configured to execute certain commands, such as commands spoken by user 10. In addition, certain speech processing or command execution functions may be performed by device 110. One or more servers 120 may also be configured to train machine learning models that may sent to a device 110 so that the device 110 may perform certain operations using the models, such as keyword spotting.

As illustrated, during training a server 120 of the system 100 may determine (130) a plurality of feature dimensions used by an SVM classifier and, from that plurality, may also determine (132) a subset of feature dimensions to be used by an SVM classifier for confirming a keyword as may potentially be detected in audio data. The server 120 may then train (134) an SVM classifier model on the subset of feature dimensions, the SVM classifier model having a plurality of support vectors, which are vectors populated with values for the subset of feature dimensions. The server 120 may then combine (136) support vectors of the plurality to determine a subset of support vectors. The SVM classifier model with the subset of support vectors (which may be considered a second SVM classifier) may thus be configured to perform keyword identification in audio data using fewer computing resources than previous techniques. The server may then send (138) the second SVM classifier including the subset of support vectors to a device 110. The device 110 may then receive (150) the SVM classifier having the subset of support vectors (for example during construction or initial configuration of device 110).

During runtime, that is while a keyword spotting system and/or ASR is implemented on the device 110 and capable of detecting keywords/performing ASR, the device 110 may use the SVM model to detect keywords. As shown in FIG. 1, a user 10 may speak an utterance including a keyword. Audio of the user's utterance is detected (152) by the device 110, for example captured by a microphone of device 110. The system may then determine (154) audio data corresponding to the audio of the utterance, for example as a result of the microphone converting the sound to an audio data signal. The device 110 may then process (156) the audio data using a keyword extractor to identify a potential keyword in the data. The device 110 may then process (158) the audio data to using the SVM model to confirm or reject the potential keyword identified by the keyword extractor.

The device 110 may use various techniques to determine whether audio input includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110, the device may perform wakeword detection to determine when a user intends to speak a command to the device 110. As noted above, a wakeword is a special word that the device 110 is configured to recognize among the various audio inputs detected by the device 110. The wakeword is thus typically associated with a command to be executed by the device 110 and/or overall system 100. Following detection of the wakeword, the system may perform speech processing on audio data associated with (for example preceding or following) the wakeword.

Figure 2:
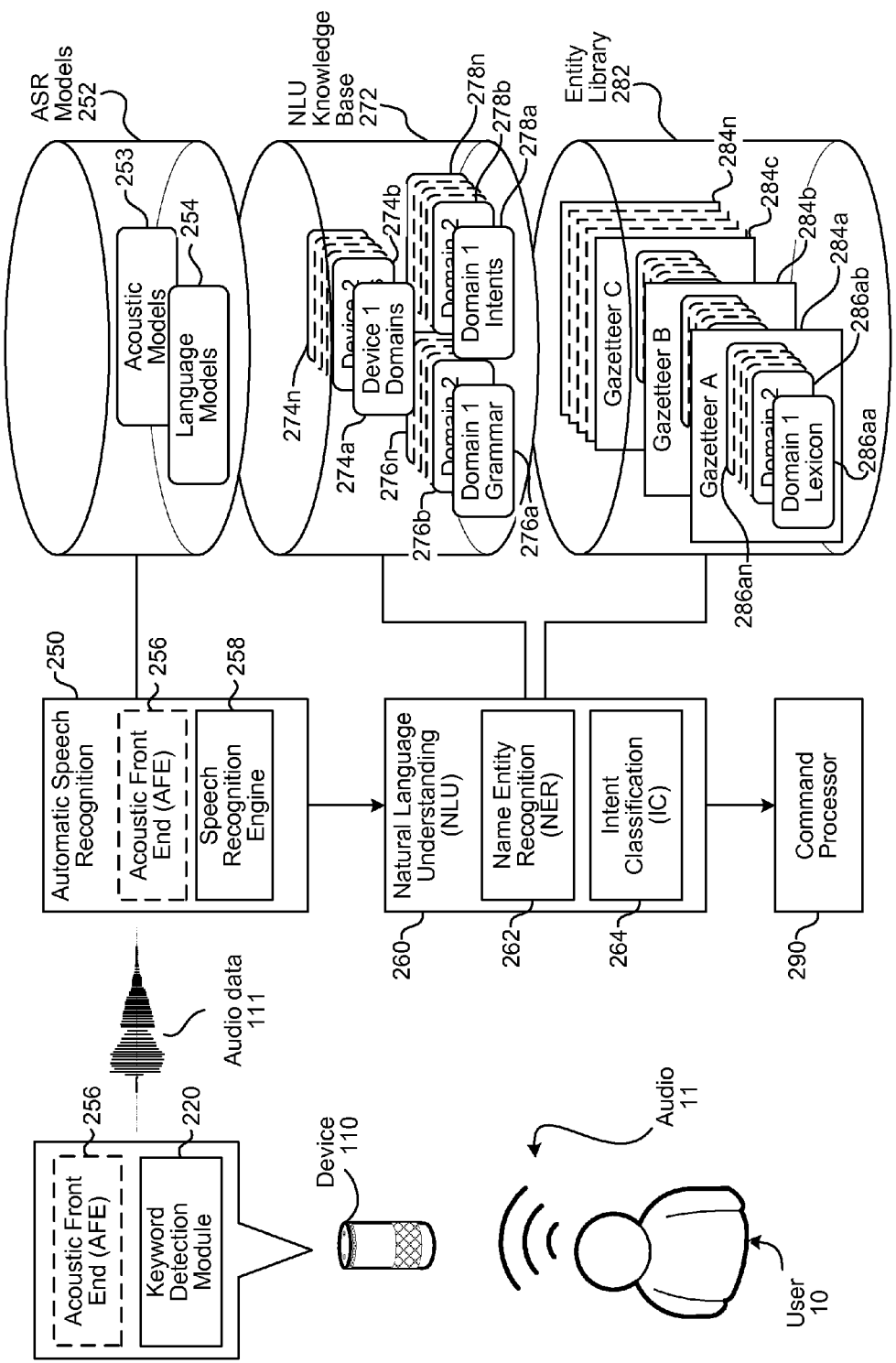
FIG. 2 is a conceptual diagram of how a spoken utterance may be processed according to embodiments of the present disclosure.

Further details of the configuration of the keyword detection is explained below, following a discussion of the overall speech processing system of FIG. 2. The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a keyword detection module 220, then processes the audio, or audio data corresponding to the audio, to determine if a keyword (specifically a wakeword) is detected in the audio. Following detection of a wakeword, the device sends audio data 111 corresponding to the utterance, to an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

An ASR process 250 converts the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

As noted above, the first stage of speech processing may include identifying a wakeword spoken to a device. The wakeword signals the beginning of a spoken command for the system to process. The wakeword may be identified using an improved keyword spotting system. One approach for keyword detection applies general large vocabulary continuous speech recognition (LVCSR) systems to decode the audio signals, with keyword searching conducted in the resulting lattices or confusion networks. LVCSR decoding may require relatively high computational resources. Another widely used approach for keyword spotting builds hidden Markov models (HMM) for each keyword and non-keyword speech signals respectively. The non-keyword speech includes other spoken words, background noise etc. There can be one or more HMMs built to model the non-keyword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In recent years, with the burgeoning applications of deep learning techniques, some keyword spotting systems are built on deep neural network (DNN)/recursive neural network (RNN) structures directly, without HMM involved. Those systems estimate the posteriors of keywords with context information, either by stacking frames within a context window for DNN, or using RNN. Following-on posterior threshold tuning or smoothing is applied for decision making.

The present system may use an improved keyword spotting system with a two-stage cascading structure of two stages. Such a two-stage configuration may be preferable for an always-on keyword spotting system running on a device with real time keyword detection, where small memory footprint and low central processing unit (CPU) utilization are desired. The first stage analyzes audio data segments to make a first pass to determine whether a keyword is represented in the audio data. The first stage may be configured to cast a "wide net," that is may be configured to attempt to capture as many potential keywords as possible, even if it may err on the side of indicating a keyword when no keyword is actually present. The second stage may then be configured to filter through the results of the first stage to eliminate any false positives, and to only identify true keywords.

The first stage, which may be referred to as a keyword hypothesis extractor, outputs to the second stage indications of selected portions of audio data that include potential keywords (i.e., keyword hypotheses) identified by the first stage. The first stage also extracts features describing the audio from those portions of audio data and outputs those features to the second stage. The second stage may include a support vector machine (SVM) classifier that uses the extracted features to classify the keyword hypotheses into false hypotheses (i.e., a particular selected portion of audio data that does not include a keyword) or true hypotheses (i.e., a particular selected portion of audio data that the SVM has confirmed does in fact include a keyword).

Offered is a system and method to improve the efficiency of the second stage SVM classifier. Specifically, a system may be configured to select a subset of features to pass to the SVM classifier, thus reducing the dimensions of support vectors and reducing the amount of data the SVM classifier processes in order to classify keyword hypotheses. Feature selection may be performed to select feature dimensions which contain the most discriminative characteristics for the keyword, that is are closely aligned with identification of a keyword in the audio data. Further, the system may be configured to merge the SVM classifier to a smaller size. This may be done by reducing the number of support vectors by merging similar ones for an existing SVM model. Both feature selection and support vector merging may result in significant efficiency improvements without significantly degrading performance.

An SVM classifier is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped from a finite-dimensional space to a high-dimensional space so that the examples of the separate categories are divided by clear gaps. New input examples to the SVM are processed by the SVM and mapped into that same space and predicted to belong to a category based on which side of the gaps they fall on.

To determine how to classify an input example (i.e., what side of the gap to assign to the input example), an SVM relies on the support vectors that are part of the SVM as well as on the trained logic of the SVM, where the logic is trained using the support vectors that are part of the SVM. Each support vector is a vector populated with data values for each of the feature dimensions that the SVM considers when making classifications. Thus, each support vector may also be thought of as a data point in the multi-dimensional space of the SVM, where the number of feature dimensions considered by the SVM determines how many dimensions are in the multi-dimensional space. When receiving a new input example, the SVM uses its logic to determine how "close" the new input example is to the support vectors that are part of the SVM. This may be done in finite dimensional space or high dimensional space depending on the SVM. By comparing the new input example to the support vectors, the SVM can determine what side of the gap to "place" the new input example, thus classifying the new input example into one of two categories that the SVM is trained to sort between.

As noted above, each support vector is populated with a value for each feature dimension. A feature dimension is a category of data (typically a number, though other values such as letters, words, etc. may be used depending on the SVM). Each support vector includes a value for each feature dimension, so that the length of a support vector corresponds to the number of feature dimensions of the SVM. Each input data example is also a vector typically having a value for each feature dimension (even if that value is 0) so that the input data example may be classified by the SVM.

A large number of support vectors and large number of feature dimensions can combine to result in a large SVM that takes a significant amount of computing resources (in terms of memory and processing power) to operate. As noted, it is desirable to shrink the SVM, both in terms of the number of support vectors, and in terms of the size of each support vectors (i.e., the number of feature dimensions processed by the SVM). The present application is directed to configuring a SVM with a reduced number of support vectors considering a reduced number of feature dimensions. The new trained SVM can be used to take as inputs data vectors representing potential keywords as detected by the system. The SVM can then classify the input data vector as corresponding to a keyword (thus confirming the potential keywords as a "true keyword") or classify the input data vector as not corresponding to a keyword (thus determining that the potential keyword is a "false positive").

Figure 3:
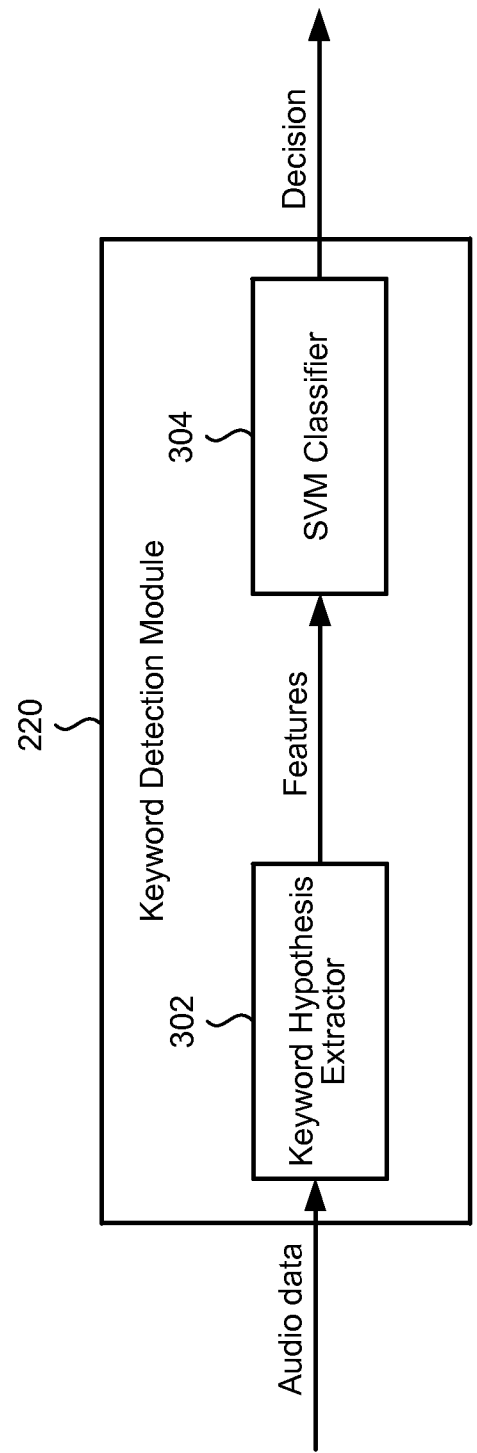
FIG. 3 illustrates a keyword detection module according to embodiments of the present disclosure.

As shown in FIG. 3, a keyword detection module 220 may include two stages, an audio keyword hypothesis extractor 302 and an SVM classifier 304. The keyword hypothesis extractor 302 processes audio data that is processed from audio detected by the system (for example by device 110). The keyword hypothesis extractor 302 determines a particular confidence score for each processed segment of audio data, where the confidence scores represents a likelihood that a particular segment of audio data (which itself corresponding to a particular section of input audio) includes a keyword. The confidence score f of audio data segment W may be represented as $f_W$. A higher value of $f_W$ indicates that it is more likely that a keyword is included in segment W. The keyword hypothesis extractor 302 is configured to select a particular audio data segment as having a keyword when $f_W \geq f_\alpha$ where $f_\alpha$ represents threshold confidence score. The value of $f_\alpha$ may be tuned so that any potential keywords are selected, to avoid failure to select potential keywords. This may result in false positives, but such false positives may be filtered by the second stage processing. When an audio data segment is selected, a D dimensional vector v is extracted from audio data segment W and passed to the second stage. Each vector v has D number of elements in it, where D represents the number of features dimensions considered by the SVM classifier 304. Thus, each vector v will have one value for each of D feature dimensions.

As discussed herein, a feature dimension represents a category of data that may be useful for keyword detection. A feature value represents a value for the particular feature dimension. The feature dimensions may be categories of audio data, such as audio data useful for ASR processing (like frequency, amplitude, or other feature dimensions for who values may be calculated by an AFE 256). The feature dimensions may also be categories of non-audio data, depending on what factors (represented by the individual feature dimensions and values for those feature dimensions) the SVM considers when classifying input vectors.

The SVM classifier 304 then receives the vector v and processes it to determine if the audio data segment W actually includes a keyword. The SVM classifier 304 works to find a hyperplane to separate data of different classes with the maximum margin. In many cases the data are not linearly separable in the original feature space (that is, the multi-dimensional space of the feature dimensions of vector v). In such situations kernel functions may be used as known in the art. A kernel function maps data into a high-dimensional space where those high-dimensional mappings can be linearly separated, which in turns generates a non-linear separation hyperplane in the original feature space. Such kernels functions may include a linear kernel, a polynomial kernel, a radial basis function (RBF) kernel, or other kernel functions as known in the art. Thus the SVM uses its trained logic and support vectors to classify the input vector v as corresponding to a keyword or not corresponding to a keyword.

The SVM feature vector v for keyword audio segment W may be computed based on the acoustic features of audio segment W (represented by audio feature dimensions) and first stage extractor generated information, which may include non-audio data (represented by non-audio feature dimensions). Such first stage extractor generated information may include values for non-audio features that are included as feature dimensions in vector v. For example, values for features such as keyword confidence or the like may be included in feature vector v. The number of features included in vector v is configurable and may include features used by the SVM classifier to determine whether a potential keyword is an actual keyword or not. For example, the feature vector v may be of dimension 71 (i.e., D=71) where each of the 71 feature dimensions included in D may assist the SVM classifier. The larger the feature vector v, the more complex the calculations to classify one or more feature vectors v as representing a true keyword or a false positive. Just because an ASR system may be configured to calculate a certain number of feature values (e.g., 71 feature dimensions) for general ASR processing does not necessarily mean that each of those feature dimensions is equally useful for classifying the output of a keyword hypothesis extractor 302. That is, not each feature dimension is equally useful for distinguishing between a true keyword and a false positive.

Thus, to reduce the complexity of calculations performed by the SVM classifier 304, it is desirable to reduce the size of D in a manner that does not significantly reduce system performance (i.e., doesn't compromise the accuracy of performance of the SVM classifier 304). Thus, the system may be configured to reduce the number of features in vector v considered by the SVM classifier 304 while maintaining the more important features that assist in classification. Thus the system may ignore features that are redundant, or are less important for keyword classification purposes (i.e., noise or other non-discriminative feature dimensions).

To identify such more important features, during training the system may analyze a variety of features and sample audio segments to determine which features closely correlate to impacting keyword classification. A training corpus C will include a number of audio segments. As part of training, the first stage keyword extractor will select N hypothesized keyword segments. These N segments may be labeled $W_1 \ldots W_N$. These segments, selected by the first stage, may be divided into two groups. The true positive group (which includes audio data segments selected by the first stage that actually include a keyword) and the false positive group (which includes audio data segments selected by the first stage that do not include a keyword). As the audio data segments are part of the training set/corpus C, whether each audio data segment is classified as a true positive or a false positive is known as part of the training ground truth. The true positive group may be labeled $C_{tp}$ and the false positive group may be labeled $C_{fp}$. For each segment $W_n$ (where n is between 1 and N), a D-dimensional feature vector $v_n$ is extracted. During training, the system may determine a subset of feature dimensions that most closely assists in determining whether an individual audio data segment belongs in the true positive group or the false positive group. The usefulness of each feature dimension for this purpose may be measured by a utility metric, where the utility metric represents a usefulness of the particular feature dimension in classifying input audio data (e.g., whether or not the input audio data includes a keyword or not).

For each dimension d (where d is between 1 and D), let $P_d$ represent the feature values found for segments in the true positive group $C_{tp}$ and let $Q_d$ represent the feature values found for segments in the false positive group $C_{fp}$. The system may use a Kullback-Leibler (KL) divergence technique as known in the art to measure the difference $C_{tp}$ and $C_{fp}$ for each particular feature dimension. Thus, the system may determine individually for each feature dimension, whether that particular feature dimension is useful in distinguishing between true positives or false positives using the KL divergence, which may serve as the utility metric described above. The KL divergence between $P_d$ and $Q_d$ may be defined in Equation 1 as:

$$D_{KL}(P_d \| Q_d) = \int_{-\infty}^{+\infty} P_d(x) \ln \frac{P_d(x)}{Q_d(x)} \quad (1)$$

The system may take calculate both $D_{KL}(P_d\|Q_d)$ and $D_{KL}(Q_d\|P_d)$ and take the minimum of the two as a symmetric KL divergence. Only those feature dimensions with the symmetric KL divergence above a threshold are retained in the smaller feature set. That is, given a threshold divergence $\theta$, a feature dimension d' is kept when it satisfies Equation 2:

$$\min(D_{KL}(P_{d'}\|Q_{d'}), D_{KL}(Q_{d'}\|P_{d'})) \geq \theta \quad (2)$$

The threshold divergence $\theta$ can be tuned from a development set, which selects a value of $\theta$ to remove as many non-discriminative feature dimensions (that is, feature dimensions which do not have sufficient usefulness in differentiating true positive from false positive) as possible, with no significant classification performance degradation for the SVM trained on the reduced set of feature dimensions. The threshold divergence $\theta$ may be set to achieve a desired system performance or may be set to result in a certain number of feature dimensions having the KL divergence about the threshold divergence.

Thus, for a particular training set, each feature dimension is analyzed to determine if it satisfies the KL divergence, thus indicating that it is a useful feature dimension for separating true positives from false positives. The KL divergence may thus be considered a type of usefulness metric, which represents the usefulness of the particular feature dimension in identifying keywords in audio data. If a particular feature dimension d' satisfies the KL divergence threshold (that is, satisfies Equation 2), it is represented in a new feature vector v', which includes dimension size D', where D'≤D and the size of D' is set by the number of feature dimensions d' that satisfy Equation 2. Each feature vector v' will include a value for each feature dimension d' and each feature vector v' will therefore be smaller than original feature vector v, which will result in faster runtime processing. In one example, the reduced sized dimension size D' may be 45, where an original full dimension set D size is 71. While KL divergence is used as an example for a usefulness metric for determining which feature dimensions to include in a reduced feature dimension set, other techniques and/or usefulness metrics may also be used. Such techniques may include minimization of L2 norm, modeled with Gaussian assumption, or other techniques known in the art. Such other techniques may be used to determine the distance for a particular feature dimension between its values in $P_d$ and its values in $Q_d$.

Figure 4:
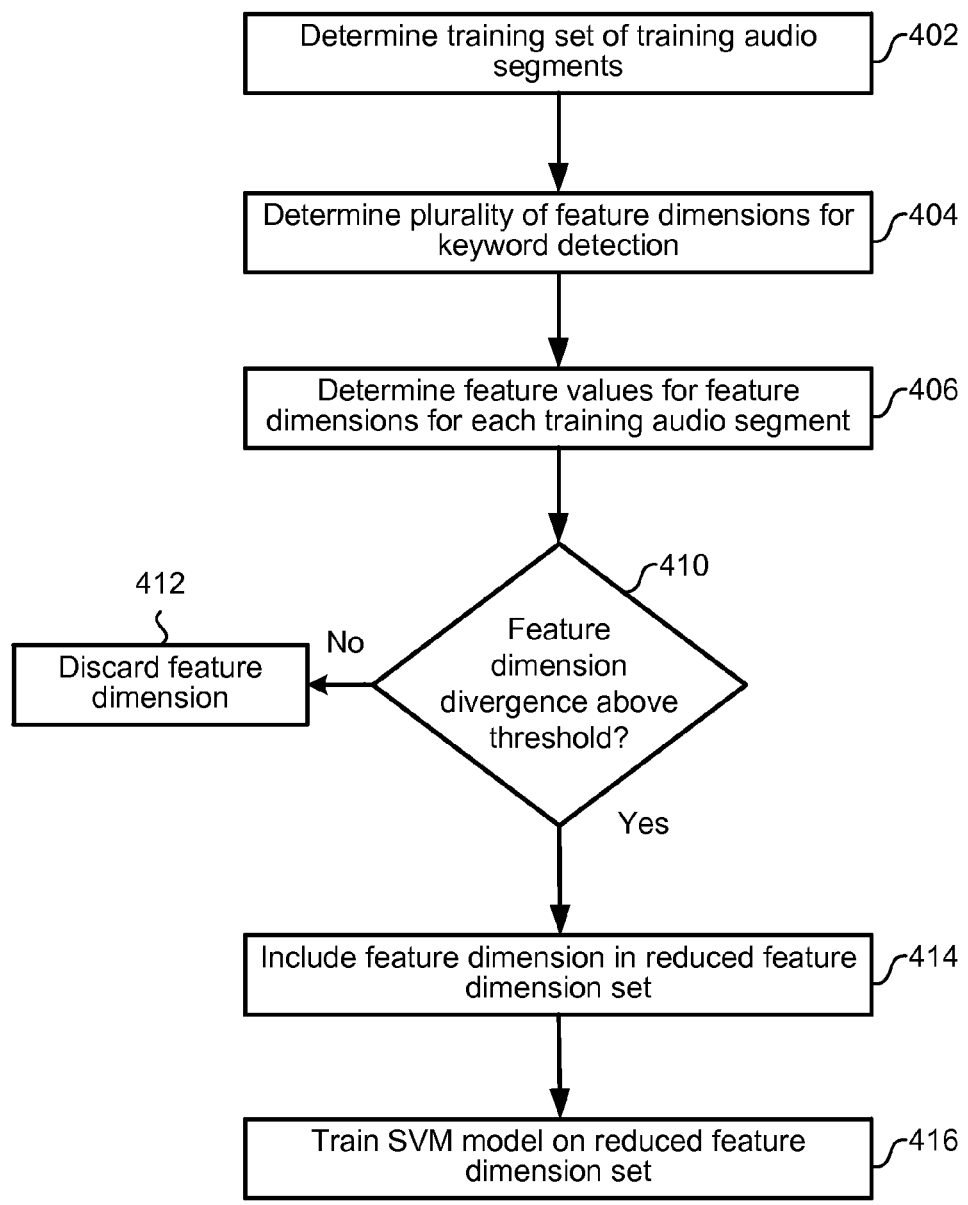
FIG. 4 is a flowchart illustrating how a reduced set of feature dimensions may be selected according to embodiments of the present disclosure.

FIG. 4 illustrates a method the system may perform during training to identify the reduced feature dimension set that will be used to create individual feature vectors v'. As shown in FIG. 4, the system may determine (402) a training set C including individual training audio segments $W_1 \ldots W_N$. As noted above, each set may be labeled as true positive or false positive. The system may then determine (404) a plurality of feature dimensions d, where those feature dimensions may be used for ASR processing. The system may then determine (406) feature values for the feature dimensions for each training audio segment. Thus the system may determine a feature vector $v_n$ for each audio segment 1 through N. Each feature vector $v_1$ through $v_N$ will be populated with values for each dimension d (for dimensions 1 through D) for the corresponding audio segment. The system may then determine (410), using the individual feature values for each feature dimension, whether each feature dimension has a divergence above a threshold and is therefore sufficiently suitable to be used to distinguish true positives from false positives. If the individual divergence is not above the threshold (410:No), that feature dimension is discarded (412). If the individual divergence is above the threshold (410:Yes), that feature dimension is included (414) in the reduced feature dimension set that will be used in reduced feature vector v'. Once the reduced feature set is determined, the system may then train (416) an SVM classifier model on the reduced feature dimension set. The trained SVM classifier may then be sent to device(s) 110 for use during runtime.

During runtime, the first stage keyword hypothesis extractor 302 will output to the SVM classifier 304 feature vectors v' which will be populated with values for each feature dimension of v' for each corresponding selected audio data segment W. The SVM classifier 304 will then operate on one or more feature vectors v' to determine if the audio data segment includes a true keyword and will output that decision to another component of the system. Because each feature vector v' will include only feature dimensions that passed the divergence test above, the values of each individual feature value of the reduced-size feature vector v' should assist the SVM classifier 304 classify the individual audio data segment more efficiently. Thus an SVM classifier 304 may be trained using support vectors including values for the feature dimensions that passed the divergence test above (i.e., have a utility or utility metric above a threshold).

The system may also use another technique during training use to optimize the second stage SVM classifier. This technique involves reducing the number of support vectors processed by the SVM. In one embodiment, the system may reduce support vector numbers by increasing the penalty hyper parameter for slack variables or changing kernel related hyper parameters (e.g., γ for a RBF kernel) for SVM training may be used to generate models with fewer support vectors. In such an embodiment, however, the system may experience performance degradation in keyword spotting. As a result, for SVM training, it may be preferable to keep the hyper parameters such as a slack variable penalty, and kernel parameters derived from a tuning step fixed.

In another embodiment, the number of support vectors are reduced by merging support vector pairs that are considered "close" to each other for processing purposes. Merging support vector pairs will reducing the number of support vectors and thus improve runtime processing speed. This embodiment may reduce the SVM model size without a significant change to the separation hyperplane and without significant impacts to the original sized SVM's performance. This technique is described in detail below, and may use RBF kernel techniques.

The system may determine an original trained SVM model with a original certain number, $N_s$, of support vectors. The system may also determine a desired reduced size for a reduced-sized SVM model with a reduced target number, $N_z$ of support vectors. To merge support vectors of the original $N_s$ support vectors to arrive at the reduced number $N_z$ support vectors, the system selects the closest support vector pair ($SV_i$, $SV_j$) belonging to the same positive or negative class based on Euclidean (i.e., straight-line) distance of the vector pairs in the feature space as known in the art, and merges the pair to a single support vector SV' by interpolating $SV_i$, $SV_j$ via an optimized weight. As merging feature vectors may not be feasible in the feature space, support vectors may be merged in high-dimensional space, as such high-dimensional space is known and used in the art when manipulating SVMs. In more detail, let $\phi(SV_i)$ and $\phi(SV_j)$ represent the high-dimensional space mappings (represented by mapping function $\phi$) of support vectors $SV_i$, $SV_j$, and $\alpha_i$, $\alpha_j$ be the corresponding weights for these two support vectors. The merged support vector M (in high-dimensional space) is determined from $\phi(SV_i)$ and $\phi(SV_j)$ as indicated by Equation 3:

$$M = \frac{\alpha_i}{\alpha_i + \alpha_j}\phi(SV_i) + \frac{\alpha_j}{\alpha_i + \alpha_j}\phi(SV_j) \quad (3)$$

As a result, the merged support vector SV' (in the original feature space) is computed by minimizing the distance in high-dimensional between $\phi(SV')$ and M as shown in Equation 4:

$$\min_{SV'} \|M - \phi(SV')\| \quad (4)$$

The merged support vector SV' may be represented as $SV' = kSV_i + (1-k)SV_j$ where the interpolation weight k is derived from optimizing an objective function. When the merged support vector SV' is computed, its weight $\alpha'$ for SV' is updated as indicated by Equation 5:

$$\alpha' = \frac{(\alpha_i + \alpha_j)M \cdot \phi(SV')}{\|\phi(SV')\|^2} \quad (5)$$

Once a closest pair of support vectors are merged the next closest pair are merged and the process continues iteratively until the target number of support vectors is reached. Individual candidate pairs of support vectors are selected only from the same class of support vectors, either positive class or negative class. Further, support vector pairs are merged by alternating class. Thus, after a pair of positive support vectors are merged, the system identifies and merges the next closest pair of negative support vectors. Then the system merges the next closest pair of positive support vectors and so on, in an alternating fashion. This alternating will prevent the system from having a significant unbalance between positive support vectors and negative support vectors. Further, a merged support vector could be merged again with another support vector if the merged support vector is part of a closest support vector pair as determined by the system. After the target number is reached, the weights for all remaining support vectors (either original support vectors or merged ones) may be optimized in a global way across the remaining support vectors together, separate from the individual re-weighting that occurs when vector pairs are merged.

Figure 5:
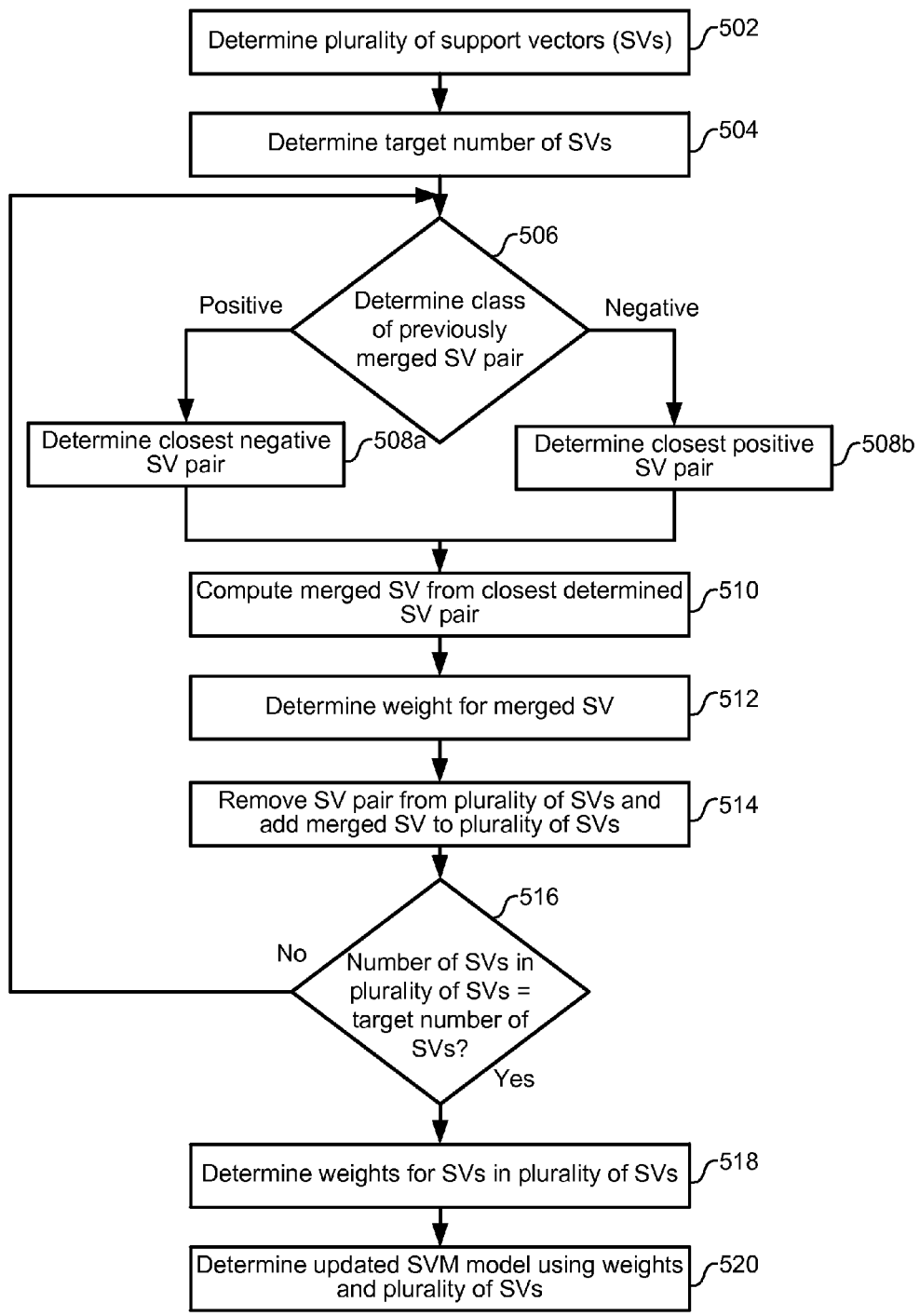
FIG. 5 is a flowchart illustrating how a reduced set of support vectors may be determined according to embodiments of the present disclosure.

The above method for determining a reduced set of support vectors for an SVM is illustrated in FIG. 5. As shown in FIG. 5, the system may determine (502) a plurality of support vectors. The plurality of support vectors may be an existing number of support vectors for a previously trained SVM. The previously trained SVM may be trained on the reduced set of feature dimensions discussed above in reference to FIG. 4 block 416, or may be trained on a different set of feature dimensions (for example a full set of feature dimensions used for ASR). The system may then determine (504) a target number of support vectors for a reduced size set of support vectors. The target number may be selected to achieve desired levels of computing resources to operate an SVM using the target number as well as to meet certain other performance thresholds, such as accuracy of detecting true keywords, false positives, etc. The system may then determine (506) a class of a previously merged support vector (SV) pair. If no SV pairs have been merged from the existing plurality of SVs, the system may be configured to start either with a positive SV pair or with a negative SV pair as an initial default. A positive SV pair includes a pair of SVs that are on the positive side of the binary classification that the SVM is trained for (for example, identifying a keyword hypothesis as a true keyword) whereas a negative pair of SVs includes a pair of SVs that are on the negative side of the binary classification that the SVM is trained for (for example, identifying a keyword hypothesis as a false positive). If the previously merged pair is positive (506:Positive), the system may determine (508a) the closest negative SV pair. If the previously merged pair is negative (506:Negative), the system may determine (508b) the closest positive SV pair. The system may then compute (510) a merged SV from the determined closest SV pair (either positive or negative). The merged SV may be computed, for example, using Equations 3 and 4 above which determine a merged SV in a high-dimensional space (for Equation 3) and then determine a SV in the feature space that corresponds to the merged SV in a high-dimensional space (for Equation 4). Other equations or methods may be used to merge the SV pair.

The system may then determine (512) a weight for the merged SV. The system may then remove (514) the SV pair from the plurality of SVs and add the merged SV to the plurality of SVs. This may be considered determining a revised plurality of SVs (or second plurality of SVs), where the revised/second plurality is the original plurality with the SV pair removed and the merged SV inserted. The merged SV will be included in the revised plurality of SVs on the same side as the pair that were merged. For example, if a positive pair of SVs are merged, the merged SV will be a positive SV and if a negative pair of SVs are merged, the merged SV will be a negative SV. The system may then check (516) if the number of SVs in the revised plurality of SVs matches the target number of SVs determined in step 504. If the numbers do not match (516:No), the system may repeat steps 506-516. If the numbers do match (516:Yes), and the target number of SVs has been reached, the system may determine (518) the weights for the remaining SVs in the revised plurality of SVs. This determining (518) may be a recalculating of the established weights to account for the remaining SVs in the revised plurality. The system may then determine (520) an updated SVM model using the weights determined in step 518 and the revised plurality of SVs, which include the target number of SVs. While the above describes a detailed method for pairwise support vector merging, other techniques for support vector merging may be used, including grouped merging, global support vector set reduction/merging, or other techniques.

The updated SVM model as determined above may then be distributed to devices 110 so that the devices may use the updated SVM model at runtime to determine whether a particular selected keyword hypothesis is a true keyword or a false positive, for example as part of an SVM classifier 304 in a keyword detection module 220. The updated SVM model with merged support vectors may be trained on the reduced size feature dimension sets described above so the techniques may be used together. Alternatively, the updated SVM model with merged support vectors may be trained on the full size feature dimension sets so the techniques may be used separately.

The above techniques of reducing features and merging support vectors results in processing using reduced computing resources (such as CPU percentage and computing time) without sufficiently impacting performance, as may be measured in factors such as miss-rate, and number of false acceptances. For example, an original SVM size with approximately 15,700 support vectors may be reduced to approximately 10,000 merged support vectors with only slight performance impacts or may be further reduced to approximately 6,000 merged support vectors with only further slight performance impacts.

Various machine learning techniques may be used to train and/or operate the SVM classifier or other machine learning models that may be used according to the above teaching. In machine learning techniques an adaptive system is "trained" by repeatedly providing it examples of data and how the data should be processed using an adaptive model until it can consistently identify how a new example of the data should be processed, even if the new example is different from the examples included in the training set from which it learned. Getting an adaptive model to consistently identify a pattern is in part dependent upon providing the system with training data that represents the desired decision features in such a way that patterns emerge. But provided data with consistent patterns, recognizing such patterns when presented with new and different data is within the capacity of today's systems, and is in fact used by a wide variety of computer systems ranging from handheld personal consumer electronics to complex massively parallel supercomputers. Such efforts fall into the discipline often referred to as "machine learning," which is a sub-discipline of artificial intelligence (also known as machine intelligence).

For example, as above, an adaptive system may be trained using example audio data segments and different feature values. An adaptive system may also be trained using different support vectors and/or merged support vectors to assist in determining a reduced size SVM.

Example machine learning techniques include, for example neural networks, inference engines, trained classifiers, etc. Examples of trained classifiers include SVMs, neural networks, decision trees, AdaBoost (short for "Adaptive Boosting") combined with decision trees, and random forests.

Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used to train the models used in the first stage and second stage.

Figure 6:
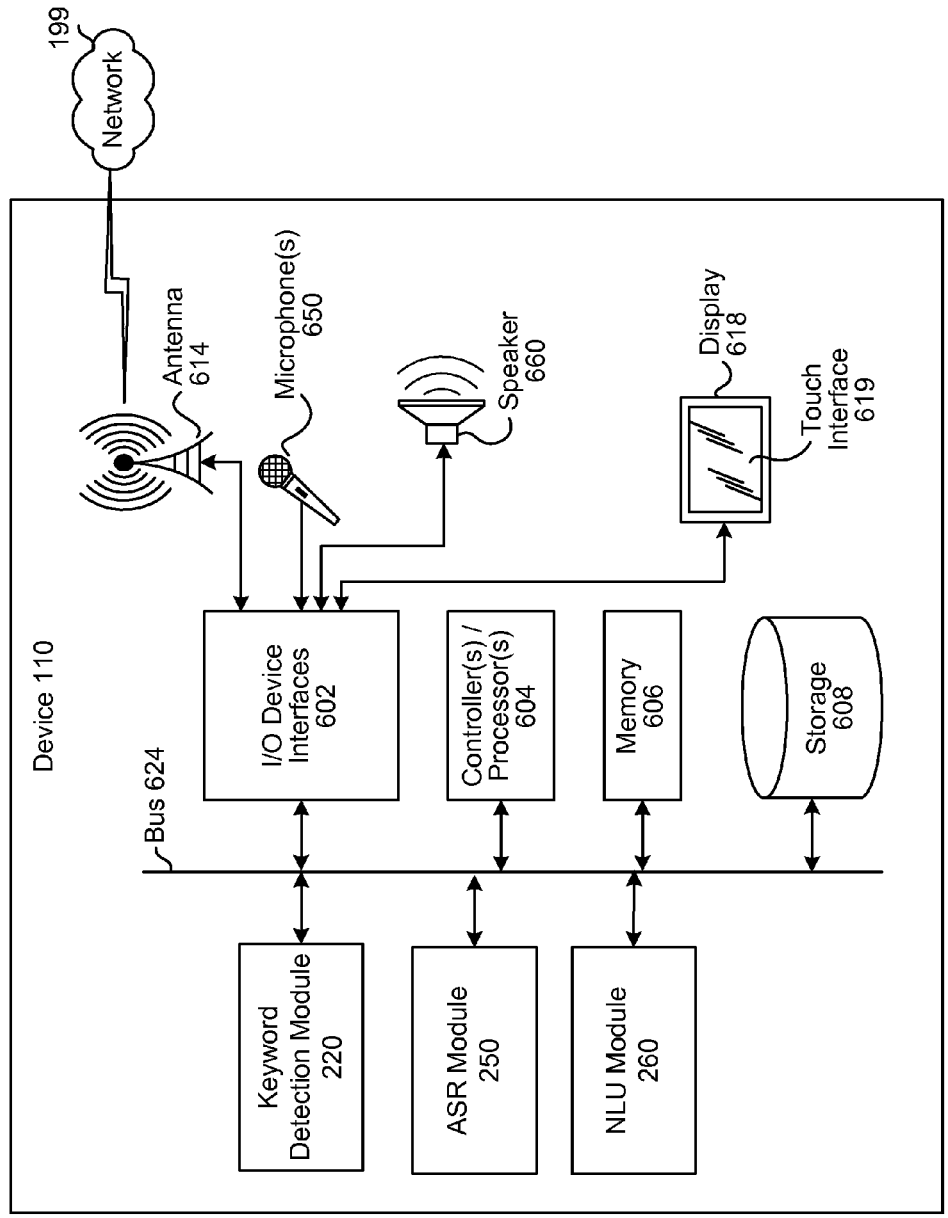
FIG. 6 is a block diagram conceptually illustrating example components of a device according to embodiments of the present disclosure.
Figure 7:
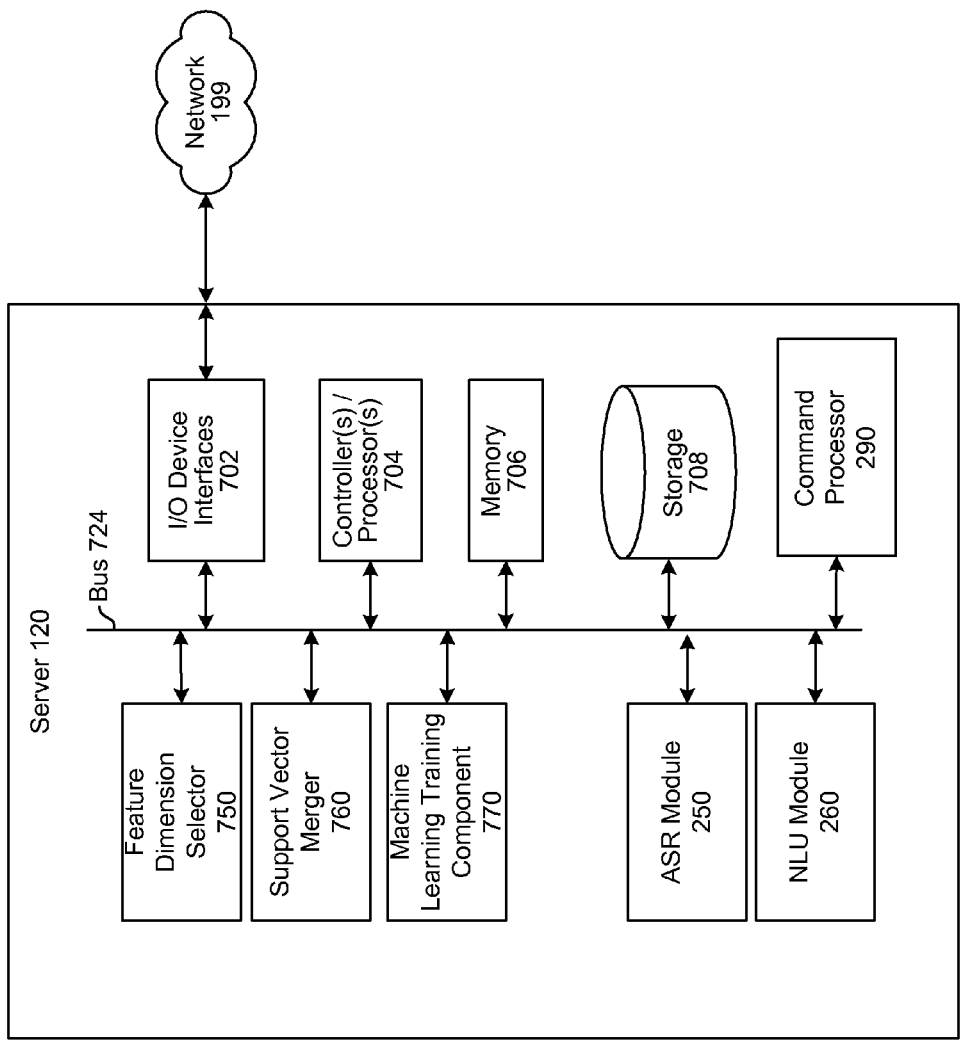
FIG. 7 is a block diagram conceptually illustrating example components of a server according to embodiments of the present disclosure.

FIG. 6 is a block diagram conceptually illustrating a local device 110 that may be used with the described system and may incorporate certain speech receiving/keyword spotting capabilities. FIG. 7 is a block diagram conceptually illustrating example components of a remote device, such as a remote server 120 that may assist with ASR, NLU processing, or command processing. Server 120 may also assist in determining similarity between ASR hypothesis results as described above. Multiple such servers 120 may be included in the system, such as one server 120 for ASR, one server 120 for NLU, etc. In operation, each of these devices may include computer-readable and computer-executable instructions that reside on the respective device (110/120), as will be discussed further below.

Each of these devices (110/120) may include one or more controllers/processors (604/704), that may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive (MRAM) and/or other types of memory. Each device may also include a data storage component (608/708), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (602/702).

Computer instructions for operating each device (110/120) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120) includes input/output device interfaces (602/702). A variety of components may be connected through the input/output device interfaces, as will be discussed further below. Additionally, each device (110/120) may include an address/data bus (624/724) for conveying data among components of the respective device. Each component within a device (110/120) may also be directly connected to other components in addition to (or instead of) being connected to other components across the bus (624/724).

Referring to the device 110 of FIG. 6, the input/output device interfaces 602 connect to a variety of components such as an audio output component such as a speaker 660, a wired headset or a wireless headset (not illustrated) or an audio capture component. The audio capture component may be, for example, a microphone 650 or array of microphones, a wired headset or a wireless headset (not illustrated), etc. If an array of microphones is included, approximate distance to a sound's point of origin may be performed acoustic localization based on time and amplitude differences between sounds captured by different microphones of the array. The microphone 650 may be configured to capture speech including an utterance. The device 110 (using microphone 650, ASR module 250, etc.) may be configured to determine audio data corresponding to the utterance. The device 110 (using input/output device interfaces 602, antenna 614, etc.) may also be configured to transmit the audio data to server 120 for further processing.

For example, via the antenna(s), the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as wakewords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base 272 and/or entity library 282, or those storages may be separately located.

One or more servers 120 may also include a command processor 290 that is configured to execute commands associate with an ASR hypothesis as described above. One or more servers 120 may also include a machine learning training component 770 that is configured to determine a reduced feature dimension set or merged support vectors as discussed above, for example in reference to FIGS. 4 and 5.

The device 110 may include a keyword detection module 220, which may be a separate component or may be included in an ASR module 250. The keyword detection module 220 receives audio signals and detects occurrences of a particular expression (such as a wakeword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The device 110 may implement automated speech recognition processing to detect a keyword in the corresponding directional audio signal. In some cases, implementation of the automated speech recognition by the device 110 may be somewhat simplified in comparison to a full recognition system because of the fact that only a single word or phrase needs to be detected. As described above, the keyword detection module 220 may employ classifier(s) or other machine learning trained models to determine whether the audio signal includes the keyword. The keyword detection module 220 may determine confidence levels or probabilities, indicating relative likelihoods that the wakeword has been detected in the corresponding audio signal(s). For example, a confidence level may be indicated as a percentage ranging from 0% to 100%. The keyword detection module 220 may operate in multiple stage, for example in a two-stage construction as described above, where a first stage involves a keyword hypothesis extractor 302 and a second stage involves a classifier, such as a SVM classifier 304. The SVM classifier 304 may include the SVM model received by the device 110 in step 150 of FIG. 1.

If the device 110 determines that a detected wake expression keyword has been uttered by the user 10, the keyword module 220 generates or provides a wake event or wake notification. The wake event may prompt further activity by the system 100, such as sending audio data for further speech processing.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 6 and 7, are exemplary, and may be located a stand-alone device or may be included, in whole or in part, as a component of a larger device or system.

Figure 8:
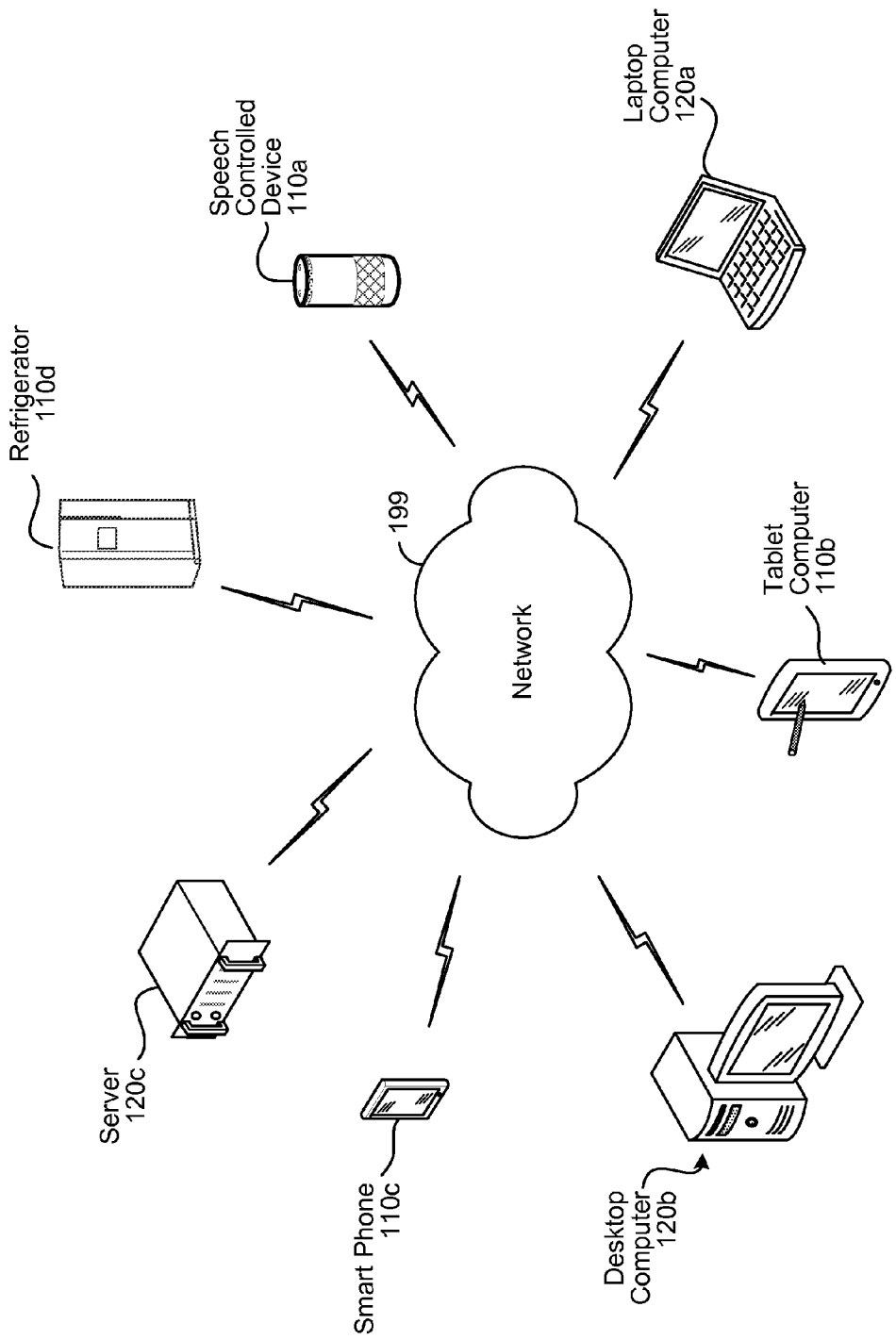
FIG. 8 illustrates an example of a computer network for use with the system.

As illustrated in FIG. 8, multiple devices (110a to 110c) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, and a refrigerator 110d may be connected to the network 199 through a wireless service provider, over a WiFi or cellular network connection or the like. Other devices are included as network-connected support devices, such as laptop computer 120a, desktop computer 120b, and a server 120c. The support devices may connect to the network 199 through a wired connection or wireless connection. Networked devices 110 may capture audio using one-or-more built-in or connected microphones 650 or audio capture devices, with processing performed by ASR, NLU, or other components of the same device or another device connected via network 199, such as an ASR 250, NLU 260, etc. of one or more servers 120c.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for detecting a wakeword in a spoken utterance using a trained classifier, the method comprising:
    determining, for each of a first plurality of audio feature dimensions, a respective utility of each audio feature dimension for classifying audio data as including or not including a wakeword;
    determining a second plurality of audio feature dimensions using the respective utilities, wherein the second plurality of audio feature dimensions is a subset of the first plurality of audio feature dimensions;
    configuring a first support vector machine (SVM) classifier to classify whether input audio data includes a wakeword, the first SVM classifier comprising a first plurality of support vectors, each of the first plurality of support vectors including a value for each of the second plurality of audio feature dimensions;
    determining a positive pair of support vectors in the first plurality of support vectors, each support vector of the positive pair of support vectors being on a positive side of a binary classification of the first SVM classifier;
    combining the positive pair of support vectors into a first combined support vector;
    determining a negative pair of support vectors in the first plurality of support vectors, each support vector of the negative pair of support vectors being on a negative side of the binary classification of the first SVM classifier;
    combining the negative pair of support vectors into a second combined support vector;
    creating additional combined support vectors by alternating between combining a positive pair of support vectors and combining a negative pair of support vectors;
    determining a second plurality of support vectors including at least the first combined support vector, the second combined support vector, and the additional combined support vectors;
    configuring a second SVM classifier comprising the second plurality of support vectors; and
    determining, using the second SVM classifier, that first audio data includes a representation of a first wakeword.

2. The computer-implemented method of claim 1, wherein the determining the second plurality of audio feature dimensions comprises:
    determining a plurality of feature vectors from a plurality of training audio data samples, wherein each feature vector includes a value for each of the first plurality of audio feature dimensions;
    determining a threshold utility in identifying a wakeword in audio data;
    determining, for a first audio feature dimension, a first utility metric for the audio feature dimension for classifying audio data as including or not including a wakeword;
    determining that the first utility metric is above the threshold utility; and
    including the first audio feature dimension in the second plurality of audio feature dimensions.

3. The computer-implemented method of claim 1, wherein the determining the second plurality of support vectors comprises:
    combining the first combined support vector and the second combined support vector into a third combined support vector by:
        mapping the first combined support vector to high dimensional space to obtain a first mapped support vector;
        mapping the second combined support vector to high dimensional space to obtain a second mapped support vector;
        multiplying the first mapped support vector by a first weight to determine a first weighted mapped support vector;
        multiplying the second mapped support vector by a second weight to determine a second weighted mapped support vector;
        adding the first weighted mapped support vector to the second weighted mapped support vector to determine a merged support vector; and
        mapping the merged support vector to the feature space to determine the third combined support vector.

4. The method of claim 3, wherein the determining the second plurality of support vectors further comprises:

determining a third weight for the third combined support vector using the first weight and the second weight;
determining a target number of support vectors;
determining a number of merged support vectors that matches the target number;
after determining the number of merged support vectors that matches the target number, determining a revised weight for the third combined support vector;
determining a weighted third combined support vector using the third combined support vector and the revised weight; and
including the weighted third combined support vector into the second plurality of support vectors.

5. A computer-implemented method comprising:
determining a first plurality of feature dimensions, wherein the determining is based on a respective utility of each feature dimension for classifying whether audio data includes a keyword;
configuring a first support vector machine (SVM) classifier, the first SVM classifier comprising a first plurality of support vectors, each of the first plurality of support vectors including a value for each of the first plurality of feature dimensions;
combining a positive pair of support vectors in the first plurality of support vectors into a first combined support vector, each support vector of the positive pair of support vectors being on a positive side of a binary classification of the first SVM classifier;
combining a negative pair of support vectors in the first plurality of support vectors into a second combined support vector, each support vector of the negative pair of support vectors being on a negative side of the binary classification of the first SVM classifier;
creating additional combined support vectors by alternating between combining a positive pair of support vectors and combining a negative pair of support vectors;
determining a second plurality of support vectors including at least the first combined support vector, the second combined support vector, and the additional combined support vectors; and
configuring a second SVM classifier comprising the second plurality of support vectors.

6. The computer-implemented method of claim 5, further comprising:
determining a first value of a first feature dimension, the first value associated with first audio data including a first keyword;
determining a second value of the first feature dimension, the second value associated with second audio data not including a keyword; and
determining a first utility metric for the first feature dimension using the first value and the second value.

7. The computer-implemented method of claim 6, further comprising:
processing a plurality of training audio data samples to determine a plurality of feature vectors, wherein each feature vector includes a value for each of a second plurality of feature dimensions and wherein the first plurality of feature dimensions is a subset of the second plurality of feature dimensions and the second plurality of feature dimensions includes the first feature dimension;
determining a threshold utility;
determining the first utility metric is above the threshold utility; and including the first feature dimension in the first plurality of feature dimensions.

8. The computer-implemented method of claim 5, wherein configuring the first SVM classifier comprises:
determining a pair of support vectors from the second plurality of support vectors, wherein the pair comprises the first combined support vector and the second combined support vector and wherein the first plurality of support vectors is a subset of the second plurality of support vectors;
merging the first combined support vector and the second combined support vector into a third combined support vector; and
including the third combined support vector in the first plurality of support vectors.

9. The computer-implemented method of claim 5, further comprising determining the positive pair of support vectors to have a closest Euclidean distance to each other in a feature space from among other pairs of support vectors on the positive side of the binary classification.

10. The computer-implemented method of claim 8, wherein merging the first combined support vector and the second combined support vector comprises:
mapping the first combined support vector to high dimensional space to obtain a first mapped support vector;
mapping the second combined support vector to high dimensional space to obtain a second mapped support vector;
multiplying the first mapped support vector by a first weight to determine a first weighted mapped support vector;
multiplying the second mapped support vector by a second weight to determine a second weighted mapped support vector;
adding the first weighted mapped support vector to the second weighted mapped support vector to determine a merged support vector; and
mapping the merged support vector to the feature space to determine the third combined support vector.

11. The computer-implemented method of claim 8, wherein determining the pair of support vectors further comprises:
determining a third weight for the third combined support vector using the first weight and the second weight;
determining a target number of support vectors;
determining a number of merged support vectors that matches the target number;
after determining the number of merged support vectors that matches the target number, determining a revised weight for the third combined support vector;
determining a weighted third combined support vector using the third combined support vector and the revised weight; and
including the weighted third support vector into the first plurality of support vectors.

12. The computer-implemented method of claim 11, further comprising determining a respective weight for each of the merged support vectors after determining the number of merged support vectors that matches the target number.

13. A computing system comprising:
at least one processor;
a memory including instructions operable to be executed by the at least one processor to cause the system to perform a set of actions comprising:
determining a first plurality of feature dimensions, wherein the determining is based on a respective utility of each feature dimension for classifying whether audio data includes a keyword;

configuring a first support vector machine (SVM) classifier, the first SVM classifier comprising a first plurality of support vectors, each of the first plurality of support vectors including a value for each of the first plurality of feature dimensions;

combining a positive pair of support vectors in the first plurality of support vectors into a first combined support vector, wherein each support vector of the positive pair of support vectors being on a positive side of a binary classification of the SVM classifier;

combining a negative pair of support vectors in the first plurality of support vectors into a second combined support vector, each support vector of the negative pair of support vectors being on a negative side of the binary classification of the SVM classifier;

creating additional combined support vectors by alternating between combining a positive pair of support vectors and combining a negative pair of support vectors;

determining a second plurality of support vectors including at least the first combined support vector, the second combined support vector, and the additional combined support vectors; and configuring a second SVM classifier comprising the second plurality of support vectors.

14. The computing system of claim 13, the set of actions further comprising:

determining a first value of a first feature dimension, the first value associated with first audio data including a first keyword;

determining a second value of the first feature dimension, the second value associated with second audio data not including a keyword; and determining a first utility metric for the first feature dimension using the first value and the second value.

15. The computing system of claim 14, the set of actions further comprising:

processing a plurality of training audio data samples to determine a plurality of feature vectors, wherein each feature vector includes a value for each of a second plurality of feature dimensions and wherein the first plurality of feature dimensions is a subset of the second plurality of feature dimensions and the second plurality of feature dimensions includes the first feature dimension;

determining a threshold utility;

determining the first utility metric is above the threshold utility; and including the first feature dimension in the first plurality of feature dimensions.

16. The computing system of claim 13, wherein configuring the first SVM classifier comprises:

determining a pair of support vectors from the second plurality of support vectors, wherein the pair comprises the first combined support vector and second combined support vector and wherein the first plurality of support vectors is a subset of the second plurality of support vectors;

merging the first combined support vector and the second combined support vector into a third combined support vector; and including the third combined support vector in the first plurality of support vectors.

17. The computing system of claim 13, the set of actions further comprising determining the positive pair of support vectors to have a closest Euclidean distance to each other in a feature space from among other pairs of support vectors on the positive side of the binary classification.

18. The computing system of claim 16, wherein merging the first combined support vector and the second combined support vector comprises:

mapping the first combined support vector to high dimensional space to obtain a first mapped support vector;

mapping the second combined support vector to high dimensional space to obtain a second mapped support vector;

multiplying the first mapped support vector by a first weight to determine a first weighted mapped support vector;

multiplying the second mapped support vector by a second weight to determine a second weighted mapped support vector;

adding the first weighted mapped support vector to the second weighted mapped support vector to determine a merged support vector; and mapping the merged support vector to the feature space to determine the third combined support vector.

19. The computing system of claim 16, wherein determining the pair of support vectors further comprises:

determining a third weight for the third combined support vector using the first weight and the second weight;

determining a target number of support vectors;

determining a number of merged support vectors that matches the target number;

after determining the number of merged support vectors that matches the target number, determining a revised weight for the third combined support vector;

determining a weighted third combined support vector using the third combined support vector and the revised weight; and including the weighted third support vector into the first plurality of support vectors.

20. The computing system of claim 19, the set of actions further comprising determining a respective weight for each of the merged support vectors after determining the number of merged support vectors that matches the target number.

* * * * *